(No Model.)
A. G. LEONARD.
DEVICE FOR SEPARATING AND REMOVING THREADS FROM WOVEN FABRICS.
No. 598,732. Patented Feb. 8, 1898.
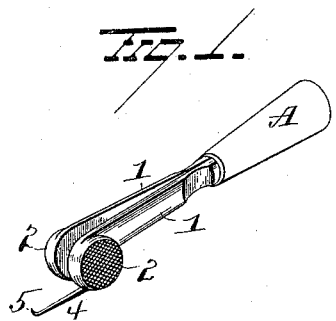
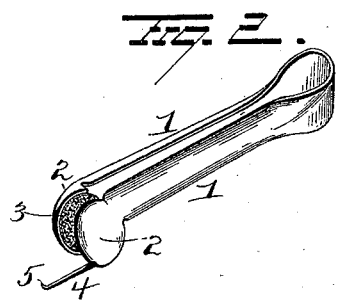
Witnesses
E. J. Nottingham.
G. F. Downing.
Inventor
A. G. Leonard
By H. A. Seymour
Attorney

United States Patent Office.

ANNIE GILLESPIE LEONARD, OF McMINNVILLE, TENNESSEE.

DEVICE FOR SEPARATING AND REMOVING THREADS FROM WOVEN FABRICS.

SPECIFICATION forming part of Letters Patent No. 598,732, dated February 8, 1898.

Application filed April 15, 1897. Serial No. 632,302. (No model.)

*To all whom it may concern:*

Be it known that I, ANNIE GILLESPIE LEONARD, of McMinnville, in the county of Warren and State of Tennessee, have invented certain new and useful Improvements in Devices for Separating and Removing Threads from Woven Fabrics; and I do hereby declare the following to be a full, clear, and exact description of the invention, such as will enable others skilled in the art to which it appertains to make and use the same.

My invention relates to an improvement in devices for separating and removing threads from woven fabric, the object being to provide a simple and cheap device adapted to be operated by the first finger and thumb, whereby the separation and removal of threads from woven fabric may be easily and quickly accomplished.

With this end in view my invention consists in certain novel features of construction and combinations of parts, as will be hereinafter more fully described, and pointed out in the claims.

In the accompanying drawings, Figure 1 represents a view of one form of my improvement, and Fig. 2 is a view of a modification of the same.

A represents a handle constructed of any suitable material, from one end of which projects the arms 1 1, which latter in the present instance are in two pieces and are secured in said handle in any desired manner. The free ends of said arms are each provided with an enlargement 2, the adjacent edges of which form thread-grasping jaws, while the outer surfaces afford extended bearing-surfaces for the thumb and finger of the operator. These enlargements, if desired, may be roughened on their outer surfaces for the purpose of preventing the device from slipping out of the grasp of the operator. Projecting outwardly from one of said enlargements 2 and preferably from the side thereof is a pin or needle point 4, which latter is provided with an upwardly-turned end 5. The object of this needle or pin point is to separate the cut threads, withdraw them slightly from the body of the fabric, and present them in a position to be readily grasped between the grasping-jaws 3 3.

The form shown in Fig. 2 of the drawings is preferably made from a single piece of sheet metal, the arms 1 1 being formed by bending the blank upon itself, thus dispensing with the employment of separable handle A. (Shown in Fig. 1.) Between the flanged edges of enlargements 2 2 are secured the clamping-jaws 3 3, which latter in the present case are preferably constructed of any suitable yielding material, such as rubber. The needle or pin point 4 is preferably drawn out from or made integral with the stock of one of said enlargements. However, this is immaterial, as it may be found desirable to make same separate and braze or otherwise secure it to one of said enlargements.

The device above described is designed for removing basting-threads, threads of machine-work, and particularly for removing threads in "fancy" or "drawn" work. In this latter class of work it has been customary to first cut the threads to be removed from the fabric being operated upon by scissors, then separating the severed threads by means of a pin or needle, and, finally, removing same by the fingers. This method is tedious and renders the operator's fingers sensitive and sore.

In operation my device is held in a natural position between the thumb and first finger, and after the desired number of threads have been severed in the fabric the bent end of the needle or pin point is then employed to lift or elevate the thread to be drawn. When the latter is in the desired position or sufficiently removed from its companions, it is grasped between the jaws 3 3, and is then withdrawn from the fabric by pulling thereon.

The jaws 3 3 are closed on the thread by simply pressing the thumb and finger toward each other, and by removing said pressure the thread may be dropped when desired.

From the foregoing it will be seen that a very simple and highly-useful device is provided which will be efficient in use and one that will practically prevent the operator's fingers from becoming sensitive or sore.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. As an article of manufacture, a device for removing threads, consisting of a pair of arms connected together and which normally spring apart, these arms having enlargements at their free ends, the adjacent edges of these enlargements forming grasping-jaws, one of these enlargements having a pin or needle point projecting outwardly therefrom, the said pin or needle point being so located with relation to the grasping-jaws as to be out of the way of the fabric when the grasping-jaws are employed to grasp a thread.

2. As a new article of manufacture, a device for removing threads, consisting of two connected arms, said arms being provided at their adjacent free ends with enlargements and a needle or pin point adjacent to one of the enlargements and projecting beyond said enlargements.

3. As a new article of manufacture, a device for removing threads, consisting of a handle provided with two forwardly-projecting arms, said arms having enlargements at their outer ends, grasping-jaws formed on the adjacent faces of said enlargements and a needle or pin point adjacent to one of the enlargements and projecting beyond said enlargements.

In testimony whereof I have signed this specification in the presence of two subscribing witnesses.

ANNIE GILLESPIE LEONARD.

Witnesses:
   H. C. LEONARD,
   WM. C. GILLESPIE.